United States Patent
De Rai et al.

(10) Patent No.: US 11,450,455 B2
(45) Date of Patent: Sep. 20, 2022

(54) ELECTRICAL CABLE FOR VERTICAL APPLICATIONS

(71) Applicant: Prysmian S.p.A., Milan (IT)

(72) Inventors: Luca Giorgio Maria De Rai, Milan (IT); Rosalba Orazi, Milan (IT); Marco Tedeschi, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/769,110

(22) PCT Filed: Dec. 4, 2017

(86) PCT No.: PCT/EP2017/081337
§ 371 (c)(1),
(2) Date: Jun. 2, 2020

(87) PCT Pub. No.: WO2019/110080
PCT Pub. Date: Jun. 13, 2019

(65) Prior Publication Data
US 2021/0158992 A1    May 27, 2021

(51) Int. Cl.
*H01B 7/04*    (2006.01)
*H01B 7/18*    (2006.01)
(Continued)

(52) U.S. Cl.
CPC ......... *H01B 7/1875* (2013.01); *E21B 17/003* (2013.01); *H01B 7/202* (2013.01);
(Continued)

(58) Field of Classification Search
CPC ........ H01B 7/17; H01B 7/1875; H01B 7/202; H01B 7/2806; H01B 7/282; H01B 13/2633; H01B 7/207; H01B 7/04; H01B 7/046
(Continued)

(56) References Cited

U.S. PATENT DOCUMENTS 2,463,590 A * 3/1949 Arutunoff ............... H01B 7/046
174/108
3,339,012 A * 8/1967 Hutchins, Jr. ............ H01B 7/14
174/128.1
(Continued)

FOREIGN PATENT DOCUMENTS

| RU | 2445656 C2 | 3/2012 |
| WO | 2016062681 A | 4/2016 |
| WO | 2016062681 A1 | 4/2016 |
| WO | wo 2016/062681 a1 * | 4/2016 .............. F16L 11/12 |
| WO | 2017018989 A1 | 2/2017 |

*Primary Examiner* — William H. Mayo, III
(74) *Attorney, Agent, or Firm* — Slater Matsil, LLP (57) ABSTRACT

An electrical cable for vertical applications includes a core having a length L, a sheath surrounding the core and extending through the whole length L and a reinforcing jacket surrounding the sheath and in direct contact therewith. The reinforcing jacket is made of concentric layers including a first layer longitudinally extending from a first cable end (the proximal or upper cable end, in use) towards a second cable end (the distal or lower cable end, in use) substantially along the whole length L. The reinforcing jacket also includes at least one further layer longitudinally extending from the first cable end towards the second cable end for a length shorter than L. At least one layer of the reinforcing jacket is a circumferentially closed metal tube.

20 Claims, 5 Drawing Sheets

(51) Int. Cl.
  *E21B 17/00* (2006.01)
  *H01B 7/20* (2006.01)
  *H01B 7/28* (2006.01)
  *H01B 7/282* (2006.01)
  *H01B 13/26* (2006.01)
  *E21B 43/12* (2006.01)

(52) U.S. Cl.
  CPC ........... *H01B 7/282* (2013.01); *H01B 7/2806* (2013.01); *H01B 13/2633* (2013.01); *E21B 43/128* (2013.01); *H01B 7/207* (2013.01)

(58) Field of Classification Search
  USPC ............................ 174/102 R, 107, 108, 70 C
  See application file for complete search history.

(56) References Cited

U.S. PATENT DOCUMENTS

| | | | | |
|---|---|---|---|---|
| 3,605,398 | A | * | 9/1971 | Carlson et al. ........ D07B 1/147 57/217 |
| 3,806,568 | A | * | 4/1974 | Carlson ................. D07B 1/162 264/45.9 |
| 3,956,877 | A | * | 5/1976 | Gilmore ................ D07B 7/167 57/211 |
| 2013/0122296 | A1 | * | 5/2013 | Rose ..................... H01B 7/046 428/376 |
| 2014/0010249 | A1 | | 1/2014 | Miura |
| 2014/0102749 | A1 | | 4/2014 | Varkey |
| 2017/0018989 | A1 | | 1/2017 | Reeves et al. |
| 2018/0174711 | A1 | | 6/2018 | Herbst |

* cited by examiner

ELECTRICAL CABLE FOR VERTICAL APPLICATIONS

CROSS-REFERENCE TO RELATED APPLICATIONS

This application is a national stage of International Application No. PCT/EP2017/081337, filed on Dec. 4, 2017, which application is hereby incorporated herein by reference in its entirety.

TECHNICAL FIELD

The present application relates to cables, and in particular to electrical cable for vertical applications.

BACKGROUND

Vertical applications such as shaft mining and oil or gas wells provide for creating a well by drilling a hole into the earth with a drilling rig. After the hole is drilled, a pipe is placed in the hole which provides structural integrity to the newly drilled well.

In some oil or gas wells, the natural pressure of the subsurface oil or gas is high enough for the fluid to flow to the surface through the pipe. In some other cases, instead, pumps are needed to extract the fluid and make it flow to the surface. Electrical submersible pumps (or, briefly, ESP) are a known type of pumps used for oil or gas wells, which are designed to be lowered into the well so as to provide the subsurface fluid with an artificial pressure that makes it flow to the surface.

In order to provide electricity supply to this type of pumps (as well as to any other type of electrical apparatus which might be needed at the bottom of a well, depending on the type of vertical application), electrical cables for vertical applications are known.

As reported by http://petrowiki.org/Electrical_submersible_pumps or http://petrowiki.org/ESP_power_cable, ESP power cables are specially constructed three-phase power cables, designed specifically for well environments. The cable design should be small in diameter, protected from mechanical abuse, and impervious to physical and electrical deterioration because of aggressive well environments. EPS power cables can be manufactured in either round or flat configurations, using several different insulation and/or metal armour materials for different hostile well environments. Typically, these cables have an expected life span of 3 years at most.

ESP power cables typically transport AC current up to 200 A or more, depending on the ESP power requirements.

An electrical cable for vertical applications may be either vertically fixed to the pipe walls, or it may be suspended at the surface and left in free hanging mode within the well. In the latter case, the electrical cable carries its own weight and, depending on the type of vertical application, may also carry the additional weight of an apparatus attached to its lower end (e.g. an electrical submersible pump).

U.S. Pat. No. 3,605,398 describes a variable weight and strength cable comprising a round core member extending through the length of the cable and a concentric layer surrounding the core member and having a generally uniform thickness throughout the cable length. Such concentric layer has two longitudinal sections of different weights. The first section (ship end section of the cable) comprises a layer of helically wrapped galvanized steel armour wires and a layer of solid polyethylene, while the second section (trailing end section of the cable) comprises a layer of cellular polyethylene and a layer of solid polyethylene.

US 2013/0122296 describes a wireline cable comprising at least one energy conductor and at least one plurality of armor wire strength members braided around the at least one energy conductor, the at least one plurality of armor wire strength members having a first total cross sectional area proximate an upper end of the wireline cable and at least one smaller second total cross sectional area distal from the upper end. Strength members may be of a steel material or of corrosion resistant materials. In one example embodiment, a coating material is adhered to the wire strength members such that the coating material outer diameter is substantially constant. The coating material is a polymeric material. In another embodiment, the strength members are shaped. There are any number of shapes that could be formed to create a nearly smooth round exterior once the cable is assembled. When the wire strength members are tapered, the outside diameter may be coated with coatings similar to those of the previously described.

WO 2016/062681 describes an umbilical tube having a first tube end, a second tube end and a tube wall defining an inner diameter d and an outer diameter D of the umbilical tube. The cross-sectional area of the tube wall perpendicular to the longitudinal axis of the umbilical tube decreases from the first tube end to the second tube end. The umbilical tube may consist of sections welded together by welds. Each tube section may be seamless, stainless steel tube or may be in the form of welded tube material.

SUMMARY

In an embodiment, an electrical cable comprises a core having a first length, a sheath surrounding the core and extending substantially through the first length, and a reinforcing jacket surrounding and indirect contact with the sheath. The reinforcing jacket is made of concentric layers and comprises a first layer longitudinally extending from a first end of the cable towards a second end of the cable and having a second length substantially equal to the first length, and a first further layer longitudinally extending from the first end of the cable towards the second end of the cable for a third length shorter than the first length, where the first layer is a circumferentially closed metal tube.

In an embodiment, a process for manufacturing an electric cable comprises a reinforcing jacket as outermost layer, the reinforcing jacket comprising concentric metal layers, wherein the process comprises forming at least one layer around a cable core starting from a continuous metallic tape with longitudinal edges, the tape being longitudinally folded and the edges welded to provide the at least one layer in form of a circumferentially closed tube.

BRIEF DESCRIPTION OF THE DRAWINGS

The present disclosure will become fully clear after reading the following detailed description, given by way of example and not of limitation, with reference to the attached drawings wherein:

FIGS. 2.1, 2.2 and 2.3 are cross-section views of the electrical cable of FIG. 1 at different intermediate positions of the cable;

FIGS. 4.1, 4.2 and 4.3 are cross-section views of the electrical cable of FIG. 3 at different intermediate positions of the cable;

FIGS. 6.1, 6.2 and 6.3 are cross-section views of the electrical cable of FIG. 5 at different intermediate positions of the cable;

FIGS. 8.1, 8.2 and 8.3 are cross-section views of the electrical cable of FIG. 7 at different intermediate positions of the cable.

DETAILED DESCRIPTION OF ILLUSTRATIVE EMBODIMENTS

The Applicant has noticed that an electrical cable for vertical applications (such as shaft mining or oil or gas well) suitable for installation in free hanging mode has to have a reduced weight and, at the same time, a high yield strength. As known, the yield strength is the tensile stress at which a body (the cable, in the present case) begins to plastically deform, namely to deform such that at least part of its deformation irreversibly persists even after the tensile strength has been removed.

This would allow the cable to efficiently carry its own weight and, in the case, the additional weight of any apparatus attached to its lower end (e.g. an electrical submersible pump), while avoiding an undesired, irreversible lengthening of the cable (and of the cable conductor, in particular) which would make the cable not reusable.

In addition, the Applicant has noticed that, in vertical applications such as shaft mining and gas or oil wells, the electrical cables could have to operate in the presence of fluids (in liquid or gaseous form). Fluids radial penetration reaching the cable conductor could have detrimental effects onto the cable performance.

In addition, especially when a vertical cable is used in gas or oil wells, it has to operate in aggressive environments wherein corrosive fluids are typically found, such as acids, sulphur compounds, hydrocarbons, etc., together with high temperature (up to 200° C. or more) and pressure (up to 300 bar or more).

An electrical cable for vertical applications has to accordingly be designed not only to provide a barrier against fluid mechanical penetration, but also to resist the attack of corrosive fluids so as to guarantee protection of the cable core (and hence proper operation of the cable) as long as possible, e.g. for a period of 2-10 years.

Hence, the Applicant has faced the problem of providing an electrical cable for vertical applications, which has a reduced overall weight, a high yield strength and which, at the same time, is capable of operating for a long time (2-10 years) in the presence of fluids, possibly even when the fluids are chemically aggressive.

The prior art teachings do not provide a solution to the above mentioned problems. U.S. Pat. No. 3,605,398 and US 2013/0122296 show cables having the outermost element made of polymeric material which, in many instance, is not suitable for resisting corrosive attack, especially for a long term. Moreover, the metallic strength layers of U.S. Pat. No. 3,605,398 and US 2013/0122296 are made of a plurality of wires which cannot act as an impervious barrier against fluid, especially under pressure, even when they are shaped to form a nearly smooth outer surface. On the other side, a tube made of welded section as shown by WO 2016/062681 is not suitable for many vertical applications, especially in oil or gas well, because circumferential welds are less resistant to tensile traction than the original material.

The Applicant has found that the above problems are solved by an electrical cable comprising a core having a length L, a sheath surrounding the core and extending through the whole length L and a reinforcing jacket surrounding the sheath and in direct contact therewith. The reinforcing jacket is made of concentric layers comprising a first layer longitudinally extending from a first cable end (the proximal or upper cable end, in use) towards a second cable end (the distal or lower cable end, in use) substantially along the whole length L. The reinforcing jacket also comprises at least one further layer longitudinally extending from the first cable end towards the second cable end for a length shorter than L. At least the first layer of the reinforcing jacket is a circumferentially closed metal tube.

For the purpose of the present description and claims, as "circumferentially closed metallic tube" it is meant a metallic tube having a continuous wall without interruptions.

Since some of the layers of the reinforcing jacket have lengths, starting from the cable upper end, shorter than the core total length, the cable according to the present disclosure is advantageously lightened at its lower end, while the continuous structure of at least one layer of the reinforcing jacket allows preserving the yield strength of the cable.

Besides, since at least the first layer of the reinforcing jacket is in the form of a circumferentially closed metallic tube, the reinforcing jacket is inherently fluid-impervious and provides hermetic sealing against penetration of fluids, even under pressure, from the environment surrounding the cable. This allows the cable to operate for a long time (typically 2-10 years) even at the presence of fluid under pressure.

Therefore, according to a first aspect, the present disclosure provides an electrical cable for vertical applications, comprising: a core having a first length; a sheath surrounding the core and extending substantially through the whole core first length; and a reinforcing jacket surrounding and in direct contact with the sheath, the reinforcing jacket being made of concentric layers comprising: a first layer longitudinally extending from a first end of the cable towards a second end of the cable and having a second length substantially equal to the first length; and at least one further layer longitudinally extending from the first end of the cable towards the second end of the cable for a third length shorter than the first length, wherein at least the first layer is a circumferentially closed metal tube.

In the present description and claims, the cable first end will be also referred to as "cable upper end" or "cable top end", while the cable second end will be also referred to as "cable lower end". The term "upper", "top" and "lower" are meant as relative positioning of the cable ends as intended for the deployment.

The core of the cable of the present description comprises at least one conductor made of a metal such as copper or aluminum, coated by an insulating system. The insulating system comprises an electrically insulating layer, generally made of a polymer to provide an insulated electrical conductor. For instance, the insulated electrical conductor may be a medium voltage (MV) conductor (4 kV-35 kV). In such case, the insulating system may also comprise an inner semiconductive layer interposed between the conductor and the insulating layer, and an outer semiconductive layer surrounding the electrically insulating layer. Inner and outer semiconductive layers are generally made of a polymer charged with a conductive filler such as carbon black. Optionally, the insulating system may comprise a metal shield surrounding the outer semiconductive layer.

In addition, the cable core may comprise optional cable elements, such as: one or more optical fibres for transmission of signal or data between the lower end and upper end of the cable and vice versa; and/or one or more twisted pairs of copper conductor for controlling the electrical apparatus; and/or one or more pressure tubes (e.g. stainless steel tubes) for transporting fluids, like hydraulic fluids, water or fluids for decreasing the oil viscosity.

In an embodiment, at least one among the first layer and the at least one further layer of the reinforcing jacket is made of a corrosion resistant metal alloy. In particular, at least the first layer of the reinforcing jacket is made of a corrosion resistant metal alloy.

In the present description and claims, as "a corrosion resistant metal alloy" it is meant a metal alloy resistant to cracking under predetermined environmental conditions. For example, NACE MR0175/ISO 15156-1:2001(E) provides indication about metal alloys resistant to cracking in defined $H_2S$-containing environments in oil and gas production. Corrosion resistant metal alloys suitable for the layers of the invention are nickel containing alloys such as Incoloy®, Hastelloy®, Inconel® and Monel®.

The presence in the reinforcing jacket of at least one layer in the form of circumferentially closed tube made of a corrosion resistant metal alloy allows the cable to operate for a long time (2-10 years) in aggressive environments wherein corrosive fluids are found. The circumferentially closed tube of anti-corrosion material is indeed capable of withstanding the attack of such substances for a long time and hence it efficiently protects the cable elements enclosed therein (including the insulated electrical conductor(s)) at least along the cable length placed at the bottom of the well. Such protective effect on the conductor(s) is advantageously enhanced by the continuous structure of the other layer(s) of the reinforcing jacket.

In an embodiment, the sheath of the cable of the present disclosure is a polymeric sheath.

In an embodiment, the reinforcing jacket is the outermost element of the electrical cable, In an embodiment, all the layers of the reinforcing jacket are circumferentially closed metal tubes.

In an embodiment, the cable of the present disclosure comprises a reinforcing jacket where the first layer is the outermost element, and the sheath is made of an expanded polymeric material and has a thickness increasing from the first end of the cable towards the second end of the cable.

In an alternative embodiment, the cable of the present disclosure comprises a reinforcing jacket where the first layer is the outermost element, and the sheath is made of a non-expanded polymeric material and has a substantially constant thickness from the first end of the cable towards the second end of the cable.

In an embodiment, the cable of the present disclosure comprises a reinforcing jacket where the first layer is the outermost element, and a coating interposed between the sheath and the first layer along a cable portion from the terminal part of the further layers and the cable second end.

In an embodiment, the coating of the cable of the disclosure is made of a polymeric material, for example a non-expanded polymeric material.

In an embodiment, the cable of the present disclosure comprises a reinforcing jacket where the first layer is an innermost layer.

In an embodiment, the cable of the present disclosure comprises a reinforcing jacket comprising at least two further layers, the second length of one further layer being shorter than the second length of the radially outer further layer.

In an alternative embodiment, the cable of the present disclosure comprises a reinforcing jacket comprising at least two further layers, the second length of one further layer being shorter than the second length of the radially inner further layer.

According to a second aspect, the present disclosure relates to a process for manufacturing an electric cable comprising a core, a sheath and a reinforcing jacket as outermost element, the reinforcing jacket comprising concentric metal layers, wherein at least one layer is provided around the cable core starting from a continuous metallic tape with longitudinal edges, the tape being longitudinally folded and the longitudinal edges being welded together to provide a layer in form of a tube.

In an embodiment, the resulting tube has an inner diameter greater than the outer diameter of the underlying layer (which can be the sheath, one of the layers of the reinforcing jacket or a coating), such that the welding causes no potential harm to the underlying layer. After welding, the tube is drawn down on the underlying layer so that a direct contact is obtained. The drawing force is such as to provide a mechanical congruence between two contacting layers (or between layer and sheath). Herein, "mechanical congruence" means that the layers of the reinforcing jacket bear the tensile elongation substantially as a whole.

For the purpose of the present description and of the appended claims, except where otherwise indicated, all numbers expressing amounts, quantities, percentages and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the appended claims, the words "a" or "an" are used to describe elements and components of the invention. This is done merely for convenience and to give a general sense of the invention. In this description and claims the words "a" or "an" should be read to include one or at least one and the singular also includes the plural unless it is obvious that it is meant otherwise.

Figure 9:
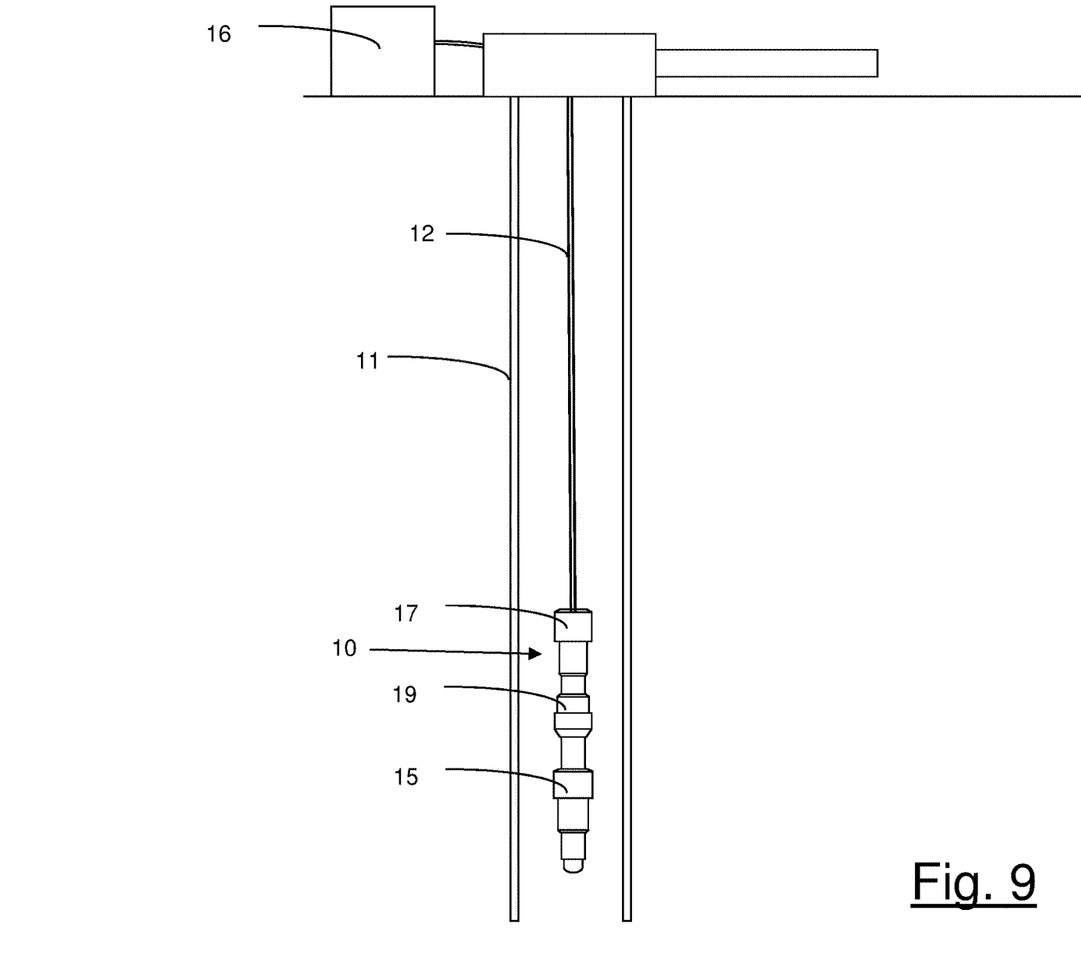
FIG. 9 relates to an ESP system where the cable of the invention may operate.
Figure 21:
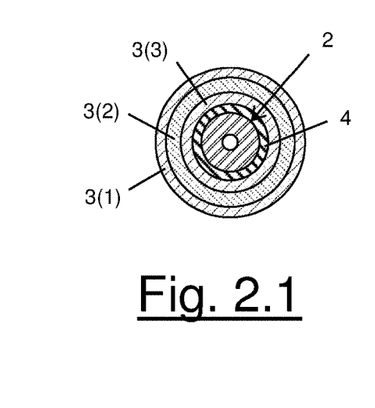
Figure 22:
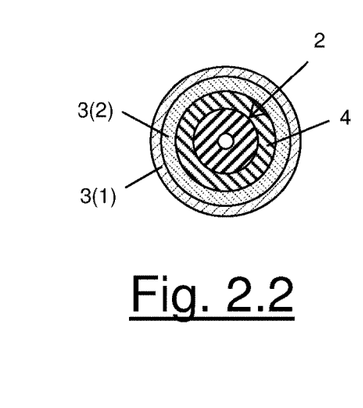
Figure 23:
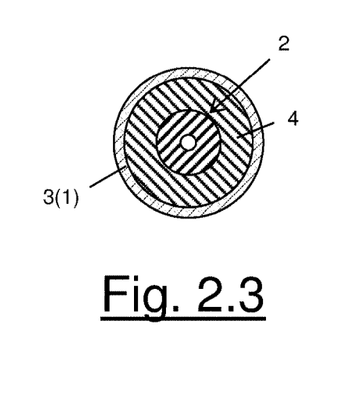
Figure 41:
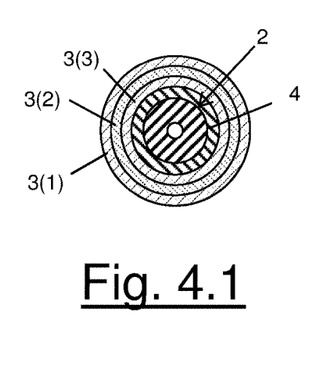
Figure 42:
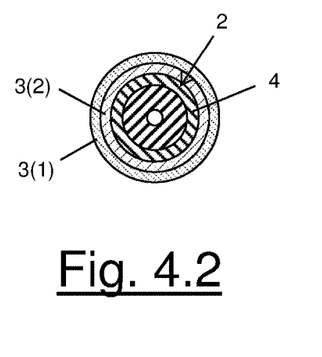
Figure 43:
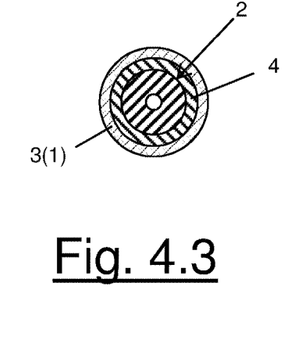
Figure 61:
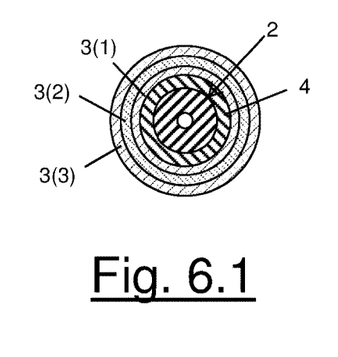
Figure 62:
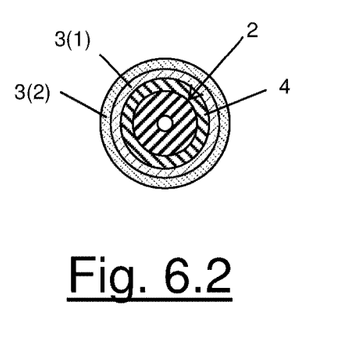
Figure 63:
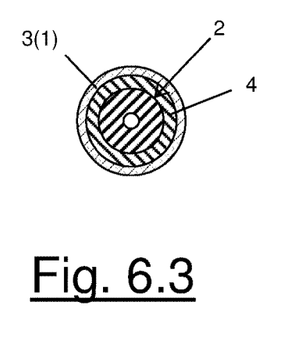
Figure 81:
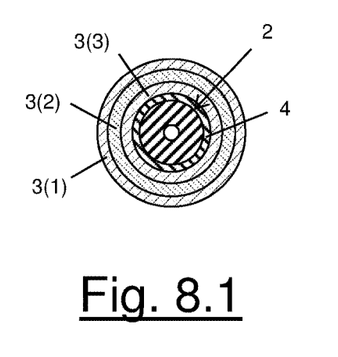
Figure 82:
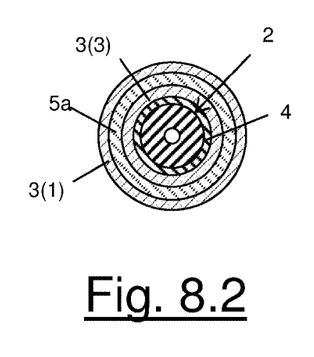
Figure 83:
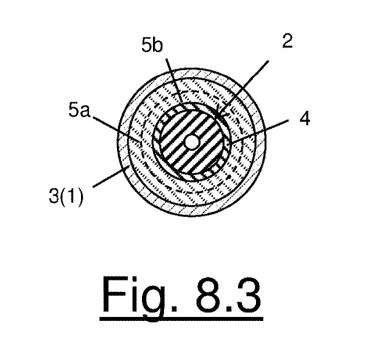

FIG. 9 shows an example of application of a vertical cable according to the present disclosure, in particular a typical ESP system construction, wherein a well is shown having a casing 11 and an ESP system 10 provided therein.

ESP system 10 secured to the lower end of a vertical cable 12 and comprising an electric submersible pump (ESP) 15 (also known as down well pump, DWP). ESP 15 is operatively connected to a motor 17, preferably through a protector 19 which prevents well fluids from entering the motor 17. Motor 17 is typically a three-phase alternate current (AC) motor designed to operate with voltages generally ranging from about 3 to about 5 kV, but ESP systems can operate at higher voltage, depending, for example, on the well depth and/or heat, as explained in the following.

Power is provided to the motor 17 from an electric supply and regulation system (ESRS) 16 (on the surface), via a power cable 12. The ESRS 16 should provide a voltage higher than that required by the motor 17 to compensate for a voltage drop in the power cable, which can be significant in deep installations (e.g. deeper than 1.5 km), requiring long power cables.

Figure 1:
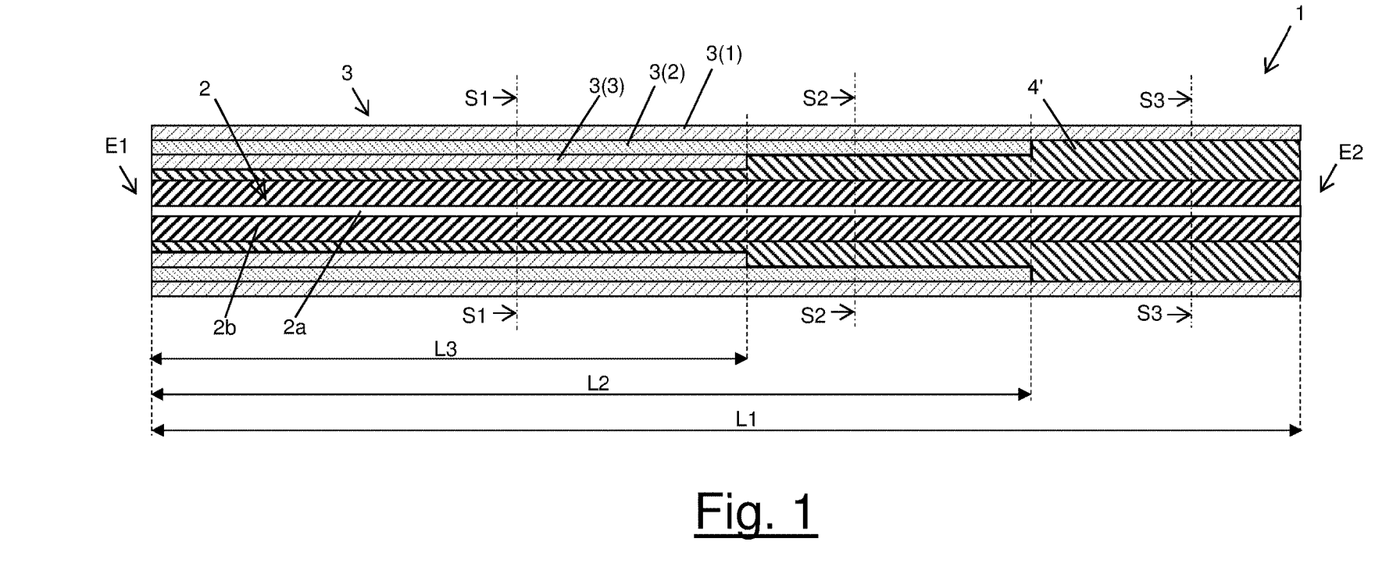
FIG. 1 is a longitudinal section view of an electrical cable for vertical applications according to a first embodiment of the present disclosure.

In FIG. 1 and FIGS. 2.1, 2.2. and 2.3, an electrical cable 1 for vertical applications according to a first embodiment of the present disclosure is shown.

The electrical cable 1 has a first end E1 suitable for being used as proximal end or upper end of the cable 1 during operation of the cable in a vertical application (e.g. in gas or oil well) and a second end E2 suitable for being used as the distal end or lower end of the cable 1 during operation of the cable in a vertical application. During operation, in particular, the electrical cable 1 is suspended at the ground surface by its upper end E1 and is left in free hanging mode, e.g. within a well. An electrical apparatus (e.g. an electrical pump such as an ESP, not shown in the drawings) may be fixed to the lower end E2 of the electrical cable 1. Therefore, in operation, the electrical cable 1 has both a mechanical function—namely, carrying the weight of this electrical apparatus—and an electrical function—namely, providing electricity supply to the electrical apparatus.

The electrical cable 1 comprises a core 2 having a length L. The length of the electric cable 1 can be of 1-15 km, and the length L is substantially the same.

The core 2 may comprise more than one electrical conductor coated by an insulating system. For instance, the core 2 may comprise three electrical conductors 2a, each coated by an insulating system 2b (schematically represented in the figures), for supplying a three-phase current to the electrical apparatus fixed to the lower end E2 of the cable 1. The three electrical conductors 2a may be medium voltage (MV) conductor (4 kV-35 kV). The core 2 may comprise optional cable elements, as mentioned above.

The electrical cable 1 also comprises a sheath 4 surrounding the core 2 (and any optional cable element, if present). The sheath 4 extends substantially through the whole core length L. The sheath 4 can be made of a polymeric material. The polymeric material of the sheath 4 is made of a compressible polymeric material, for example a thermoplastic, elastomeric material. In particular, in the embodiment of FIG. 1 and FIGS. 2.1, 2.2. and 2.3, the polymeric material of the sheath 4 is an expanded polymeric material, e.g. obtained from a thermoplastic, elastomeric material mixed with a foaming agent, such as azodicarbonamide, azobisisobutyronitrile, and diazoaminobenzene.

The electrical cable 1 also comprises a reinforcing jacket 3 arranged to form the outermost element of the cable 1.

In the embodiment of FIG. 1 and FIGS. 2.1, 2.2. and 2.3, the reinforcing jacket 3 comprises a first layer 3(1), which can be made of a corrosion resistant metal alloy. The corrosion resistant metal alloy of the first layer 3(1) may be an Incoloy® alloy, like Incoloy® 825. Alternatively, the first layer 3(1) may be made of a metal having a lower corrosion resistance such as stainless steel, for example 316L stainless steel.

In an embodiment, the first layer 3(1) longitudinally extends substantially along the whole conductor length L, namely its length L1 is substantially equal to L.

In the first embodiment, the reinforcing jacket 3 comprises two further layers 3(2), 3(3), which will be also referred to as second layer 3(2) and third layer 3(3)).

Further layers 3(2), 3(3) longitudinally extend starting from the upper cable end E1 towards the lower cable end E2 for respective lengths L2, L3 shorter than the conductor length L. In turn, the length L2 of the second layer 3(2) is longer than the length L3 of the third layer 3(3).

The further layers 3(2), 3(3) may be made of a corrosion resistant metal alloy like first layer 3(1). Alternatively, the further layers 3(2), 3(3) may be made of a different metallic material having a corrosion resistance lower than that of the first layer 3(1). For instance, further layers 3(2), 3(3) may be made of stainless steel, for example 316L stainless steel.

The choice of the metal for the layers 3(1), 3(2), 3(3) of the reinforcing jacket 3 is made in view of the intended cable application. Where a corrosive environment is envisaged (like, for example, in a gas or oil well), at least the first layer 3(1) is made a corrosion resistant metal alloy. Such a choice is taken also considering that corrosion resistant metal alloys are generally more expensive than, for example, stainless steel.

According to the first embodiment shown in FIG. 1 and FIGS. 2.1, 2.2 and 2.3, the first layer 3(1) is the outermost element of the reinforcing jacket 3, while the further layers 3(2), 3(3) are inner layers of the reinforcing jacket 3, namely they are interposed between the sheath 4 and the first layer 3(1).

In particular, the second layer 3(2) is internally adjacent to and in direct contact with the first layer 3(1) and extends from the upper cable end E1 towards the lower cable end E2 for a length L2 shorter than L1=L. The third layer 3(3) is in turn interposed between and in direct contact with the sheath 4 and the second layer 3(2) and extends from the upper cable end E1 towards the lower cable end E2 for a length L3 shorter than L1=L and also shorter than L2. In this way the cable metallic portion decreases along the cable length from the upper end E1 to the lower end E2 making the cable lighter along the same direction.

Further, according to the first embodiment, the first layer 3(1) has an outer diameter which is constant along its whole length L1. This constant outer diameter corresponds to the outer diameter of the whole cable 1 and is preferably comprised between 25 mm and 50 mm.

Both the first layer 3(1) and the further layers 3(2), 3(3) of the reinforcing jacket 3 are circumferentially closed metallic tubes. Each circumferentially closed metallic tube can have a uniform thickness, which is preferably comprised between 1 mm and 2 mm.

In particular, each layer 3(1), 3(2), 3(3) of the reinforcing jacket 3 can be obtained from a continuous metallic tape which, upon manufacturing of the cable 1, is longitudinally folded and welded. This way, each layer 3(1), 3(2), 3(3) is fluid-impervious, namely it provides hermetic sealing against penetration of fluids from the environment surrounding the cable 1.

In particular, upon manufacturing of cable 1, the third layer 3(3) is firstly obtained by longitudinally folding and welding a first metallic tape (e.g. stainless steel) directly around the sheath 4. The third layer 3(3) is then drawn down on the sheath 4 so that, for a length L3, it constricts the compressible polymeric material of the sheath 4 at a certain degree.

Then, the second layer 3(2) is obtained by longitudinally folding and welding a second metallic tape (e.g. stainless steel) around the third layer 3(3) and the sheath 4. The second layer 3(2) is then drawn down onto the third layer 3(3) and the sheath 4 so that, for a length L2-L3, it compresses the compressible polymeric material of the sheath 4 at certain degree lower than that exerted by the third layer 3(3).

Finally, the first layer 3(1) is obtained by longitudinally folding and welding a third metallic tape (in the case, a corrosion resistant metal alloy tape) around the second layer 3(2) and the sheath 4. The first layer 3(1) is then drawn down onto the second layer 3(2) and the sheath 4 so that, for a length L1-L2, it can compress the compressible polymeric material of the sheath 4 at a certain degree lower than that exerted by the second layer 3(2). In the case of the first layer 3(1), the compression exerted onto the polymeric material of the sheath 4 can also be substantially null.

Hence, according to this first embodiment, while proceeding from the upper cable end E1 to the lower cable end E2, the outer diameter of the reinforcing jacket 3 (and, hence, of the whole cable 1) is substantially constant and, at the same time, its thickness exhibits a stepwise decrease in a radially inner direction, which induces the thickness of the sheath 4 to correspondingly increase in a stepwise manner in a radially outer direction.

Since the further layers 3(2), 3(3) do not extend through the whole conductor length L, the electrical cable 1 is advantageously lightened, especially at its lower end E2, while the continuous structure of all the layers 3(1), 3(2), 3(3) of the reinforcing jacket 3 allows preserving the yield strength of the cable 1.

Besides, since all the layers 3(1), 3(2), 3(3) of the reinforcing jacket 3 are in the form of circumferentially closed metallic tubes, they are inherently fluid-impervious and provide hermetic sealing against penetration of fluids from the environment surrounding the cable 1. This, in combination with the corrosion resistant metal alloy of the first layer 3(1), allows the cable 1 to operate for a long time (2-10 years) in aggressive environments wherein corrosive fluids are found. The circumferentially closed tube of corrosion resistant metal alloy of the first layer 3(1) is indeed capable of withstanding the attack of such substances for a long time and hence it efficiently protects the cable elements enclosed therein (including the sheath 4 and core 2) along the whole cable length L.

Figure 3:
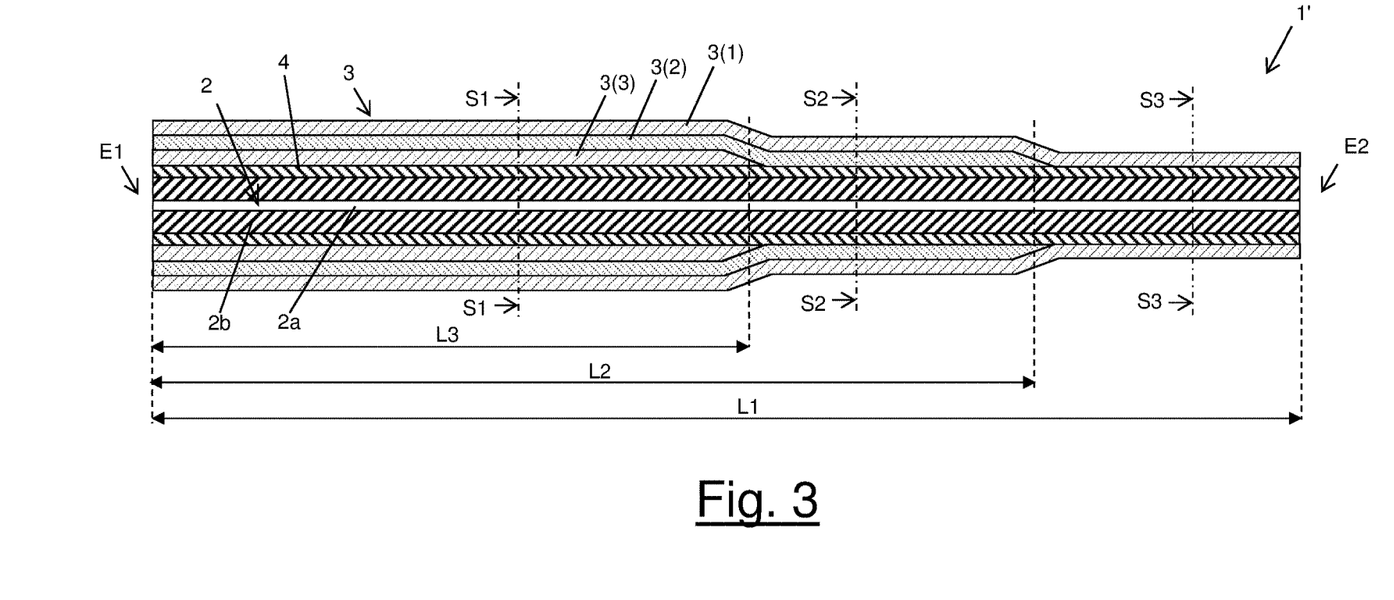
FIG. 3 is a longitudinal section view of an electrical cable for vertical applications according to a second embodiment of the present disclosure.

In FIG. 3 and FIGS. 4.1, 4.2. and 4.3, an electrical cable 1' for vertical applications according to a second embodiment of the present disclosure is shown.

The electrical cable 1' according to the second embodiment comprises a core 2 similar to that of cable 1 of the first embodiment.

The electrical cable 1' according to the second embodiment also comprises a sheath 4, which extends through the whole conductor length L. In the present embodiment, the sheath 4 is made of a non-expanded polymeric material.

The electrical cable 1' also comprises a reinforcing jacket 3 arranged to form the outermost element of the cable 1.

The reinforcing jacket 3 of the cable 1' comprises a first layer 3(1) which longitudinally extends substantially along the whole conductor length L, namely its length L1 is substantially equal to L.

In the second embodiment, the first layer 3(1) is made, for example, of a corrosion resistant metal alloy. Exemplary corrosion resistant metal alloy for the first layer 3(1) have been described above with reference to the first embodiment.

In the present embodiment, the reinforcing jacket 3 also comprises two further layers 3(2), 3(3), which longitudinally extend starting from the upper cable end E towards the lower cable end E2 for respective lengths L2, L3 shorter than the conductor length L. In turn, the length L2 of the second layers 3(2) is longer than the length L3 of the second layers 3(3).

Exemplary metallic materials for the layers 3(2), 3(3) have been described above with reference to the first embodiment.

As for the choice of the metal for the layers 3(1), 3(2), 3(3) of the reinforcing jacket 3, the same considerations made above in connection with the first embodiment apply.

According to the second embodiment, the first layer 3(1) is the outermost element of the reinforcing jacket 3, while the further layers 3(2), 3(3) are inner layers of the reinforcing jacket 3, being interposed between the sheath 4 and the first layer 3(1).

In particular, the second layer 3(2) is internally adjacent to and in direct contact with the first layer 3(1) and extends from the upper cable end E1 towards the lower cable end E2 for a length L2 shorter than L1=L. The third layer 3(3) is in turn interposed between the sheath 4 and the second layer 3(2) and extends from the upper cable end E1 towards the lower cable end E2 for a length L3 shorter than L1=L and also shorter than L2.

Both the first layer 3(1) and the further layers 3(2), 3(3) of the reinforcing jacket 3 are circumferentially closed metallic tubes, each one having a thickness between 1 mm and 2 mm. Each layer 3(1), 3(2), 3(3) can be obtained from a continuous metallic tape which, upon manufacturing of the cable 1, is longitudinally folded and welded, so that each layer 3(1), 3(2), 3(3) is fluid-impervious.

In particular, upon manufacturing of cable 1', the third layer 3(3) is firstly obtained by longitudinally folding and welding a first metallic tape (e.g. stainless steel) directly around the sheath 4. The third layer 3(3) is then drawn down onto the sheath 4 so that, for a length L3, it is in direct contact with the polymeric material of the sheath 4.

Then, the second layer 3(2) is obtained by longitudinally folding and welding a second metallic tape (e.g. stainless steel) around the third layer 3(3) and the sheath 4. The second layer 3(2) is then drawn down onto the third layer 3(3) and the sheath 4 so that it is in contact with the layer second 3(3) for a length L3 and, for a length L2-L3, it is in contact with the polymeric material of the sheath 4. While being drawn down, the second layer 3(2) exerts a pressure on the terminal part of the third layer 3(3) in the direction of the cable lower end E2 such that this terminal part is compressed in a tapered way.

Finally, the first layer 3(1) is obtained by longitudinally folding and welding a third metallic tape (in particular, a corrosion resistant metal alloy tape) around the second layer 3(2) and the sheath 4. The first layer 3(1) is then drawn down onto the second layer 3(2) and the sheath 4 so that it is in contact with the second layer 3(2) for a length L2 and, for a length L1-L2, it is in contact with the polymeric material of the sheath 4. While being drawn down, the first layer 3(1) exerts a pressure on the terminal part of the second layer 3(2) in the direction of the cable lower end E2 such that this terminal part is compressed in a tapered way.

Hence, according to this second embodiment, while proceeding from the upper cable end E1 to the lower cable end E2, the thickness of the reinforcing jacket 3 exhibits a stepwise decrease and the outer diameter of the whole cable 1' correspondingly decreases in a stepwise manner.

The electrical cable 1' according to the second embodiment exhibits the same advantages as the cable 1 according to the first embodiment, namely: reduced weight, especially at the lower end of the cable, high yield strength and capability of operating for a long time (2-10 years) in aggressive environments wherein corrosive fluids are found, such as acids, hydrocarbons and other substances typically present within gas or oil wells.

Figure 5:
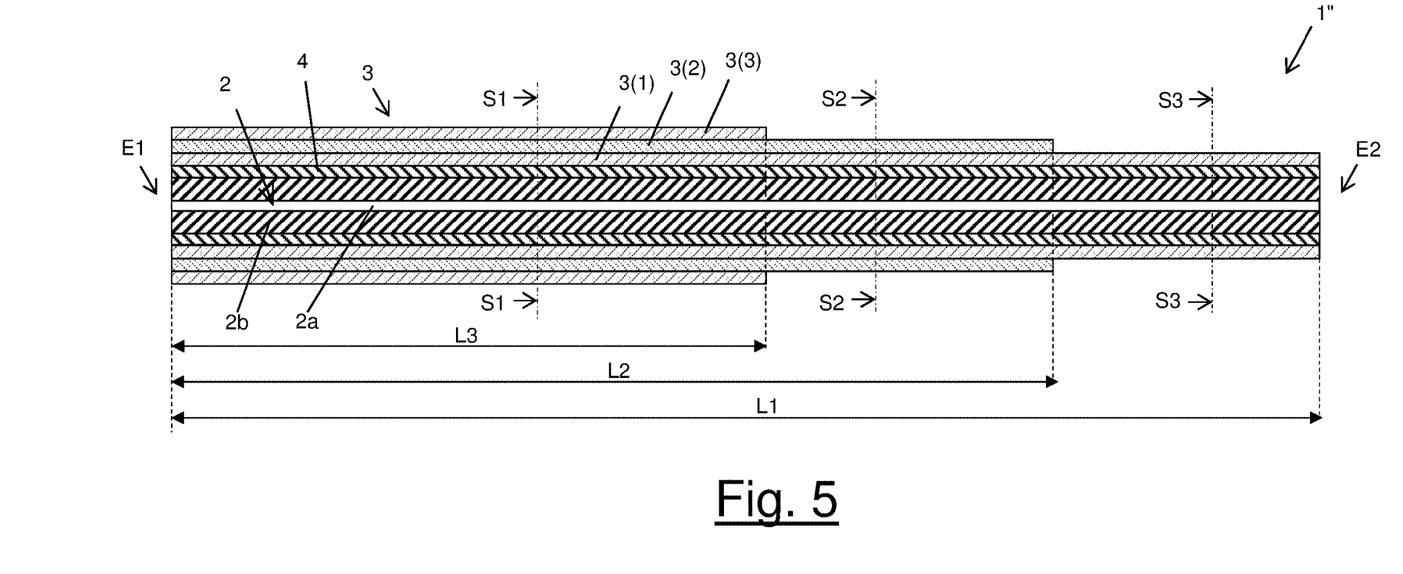
FIG. 5 is a longitudinal section view of an electrical cable for vertical applications according to a third embodiment of the present disclosure.

In FIG. 5 and FIGS. 6.1, 6.2. and 6.3, an electrical cable 1" for vertical applications according to a third embodiment of the present disclosure is shown.

The electrical cable 1" according to the third embodiment comprises a core 2 similar to that of cable 1 of the first embodiment.

The electrical cable 1" according to the third embodiment also comprises a sheath 4, which extends through the whole conductor length L. In the present embodiment, the sheath 4 is made of a polymeric material non-expanded and substantially non compressible.

The electrical cable 1" also comprises a reinforcing jacket 3 arranged to form the outermost element of the cable 1.

The reinforcing jacket 3 of the cable 1" comprises a first layer 3(1) which longitudinally extends substantially along the whole conductor length L, namely its length L1 is substantially equal to L.

The corrosion resistant metal alloy of the first layer 3(1) may be an Incoloy® alloy, like Incoloy® 825. Alternatively, the first layer 3(1) may be made of a metal having a lower corrosion resistance such as stainless steel, for example 316L stainless steel.

In the present embodiment, the reinforcing jacket 3 also comprises two further layers 3(2), 3(3), which will be also referred to as second layer 3(2) and third layer 3(3).

Further layers 3(2), 3(3) longitudinally extend starting from the upper cable end E1 towards the lower cable end E2 for respective lengths L2, L3 shorter than the conductor length L. In turn, the length L2 of the second layers 3(2) is longer than the length L3 of the second layers 3(3).

Exemplary metallic materials for the layers 3(2), 3(3) have been described above with reference to the first embodiment.

Also for the present embodiment, the choice of the metal for the layers 3(1), 3(2), 3(3) of the reinforcing jacket 3 follows the same considerations made above in connection with the first embodiment. In particular, where a corrosive environment is envisaged (like, for example, in a gas or oil well), at least the first layer 3(1) and the second layer 3(2) are made a corrosion resistant metal alloy, while the third layer 3(3) can be made of a metal having a lower corrosion resistance because its length is limited to a well depth where corrosive fluids are absent or in a negligible amount.

According to the third embodiment, the first layer 3(1) is the innermost layer of the reinforcing jacket 3, while the further layers 3(2), 3(3) are outer layers of the reinforcing jacket 3 and are arranged around the first layer 3(1).

In particular, the second layer 3(2) is externally adjacent to and in direct contact with the first layer 3(1) and extends from the upper cable end E1 towards the lower cable end E2 for a length L2 shorter than L1=L. The third layer 3(3) is in turn externally adjacent to and in direct contact with the second layer 3(2) and extends from the upper cable end E1 towards the lower cable end E2 for a length L3 shorter than L1=L and than L2.

Both the first layer 3(1) and the further layers 3(2), 3(3) of the reinforcing jacket 3 are circumferentially closed metallic tubes, each one having a thickness between 1 mm and 2 mm. Each layer 3(1), 3(2), 3(3) can be obtained from a continuous metallic tape which, upon manufacturing of the cable 1, is longitudinally folded and welded, so that each layer 3(1), 3(2), 3(3) is fluid-impervious.

In particular, upon manufacturing of cable 1", the first layer 3(1) is firstly obtained by longitudinally folding and welding a first metallic tape (for example, a corrosion resistant metal alloy tape) directly around the sheath 4. The first layer 3(1) is then drawn down on the sheath 4 so that it is in contact with the polymeric material of the sheath 4 substantially through its whole length L.

Then, the second layer 3(2) is obtained by longitudinally folding and welding a second metallic tape (e.g., a corrosion resistant metal alloy tape) around the first layer 3(1). The second layer 3(2) is then drawn down onto the first layer 3(1) so that it is in direct contact with the first layer 3(1) for a length L2.

Finally, the third layer 3(3) is obtained by longitudinally folding and welding a third metallic tape (e.g. stainless steel tape) around the second layer 3(2). The third layer 3(3) is then drawn down onto the second layer 3(2) so that it is in contact with the second layer 3(2) for a length L3.

Hence, according to the third embodiment, while proceeding from the upper cable end E1 to the lower cable end E2, the thickness and the outer diameter of the reinforcing jacket 3 exhibits a stepwise decrease, which brings the outer diameter of the whole cable 1" to correspondingly decrease in a stepwise manner.

The electrical cable 1" according to the third embodiment exhibits the same advantages as the cable 1 according to the first embodiment, namely: reduced weight, especially at the lower end of the cable, high yield strength and capability of operating for a long time (2-10 years) also in aggressive environments wherein corrosive fluids are found, such as acids, hydrocarbons and other substances typically present within gas or oil wells.

Figure 7:
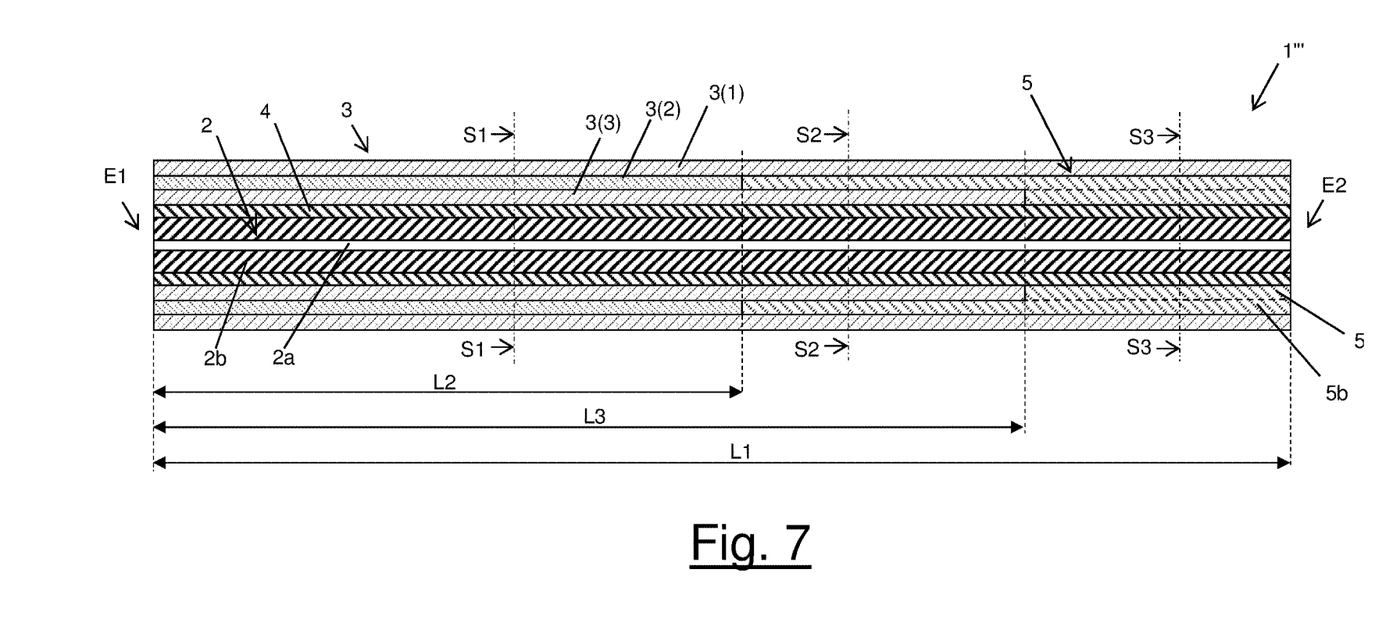
FIG. 7 is a longitudinal section view of an electrical cable for vertical applications according to a fourth embodiment of the present disclosure.

In FIG. 7 and FIGS. 8.1, 8.2. and 8.3, an electrical cable 1''' for vertical applications according to a fourth embodiment of the present disclosure is shown.

The electrical cable 1''' according to the fourth embodiment differs from cable 1 according to the first embodiment in that the length L3 of the third layer 3(3) of the reinforcing jacket 3 is longer than the length L2 of the second layer 3(2) of the reinforcing jacket 3, and in that a coating 5 is interposed between the sheath 4 and the first layer 3(1) along the cable portion from the terminal parts of the further layers 3(2) and 3(3) to the cable lower end E2. Such coating 5 comprises an inner coating step 5a of length L1-L3 which extends from the terminal parts of the third layer 3(3) to the cable lower end E2 and an outer coating step 5b of length L1-L2 which extends from the terminal parts of the second layer 3(2) to the cable lower end E2.

The coating 5 is made of a polymer material which can be the same of that of sheath 4.

Both the first layer 3(1) and the further layers 3(2), 3(3) of the reinforcing jacket 3 are circumferentially closed metallic tubes, each one having a thickness between 1 mm and 2 mm. Each layer 3(1), 3(2), 3(3) can be obtained from a continuous metallic tape which, upon manufacturing of the cable 1, is longitudinally folded and welded, so that each layer 3(1), 3(2), 3(3) is fluid-impervious.

As for the choice of the metal for the layers 3(1), 3(2), 3(3) of the reinforcing jacket 3, the same considerations made above in connection with the first embodiment apply.

Upon manufacturing of cable 1''', the third layer 3(3) is firstly obtained by longitudinally folding and welding a first metallic tape (e.g. a stainless steel tape) directly around the sheath 4. The third layer 3(3) is then drawn down on the sheath 4 so that it is in contact with the polymeric material of the sheath 4.

Then, the second layer 3(2) is obtained by longitudinally folding and welding a second metallic tape (e.g. stainless steel tape) around the third layer 3(3). The second layer 3(2) is then drawn down onto the third layer 3(3) so that it is in contact with the third layer 3(3) for a length L2.

The coating 5 is extruded over the sheath 4 and the third layer 3(3) in one or two stages. In the first case, steps 5a and 5b are a continuous polymer block. In the second case, a border could be present at the interface between steps 5a and 5b though, depending on the extrusion temperature and timing and because the two steps are made of the same material, the outer surface of step 5a and the inner surface of step 5b could substantially merge.

Finally, the first layer 3(1) is obtained by longitudinally folding and welding a third metallic tape (e.g. a corrosion resistant metal alloy) around the second layer 3(2) and the coating 5. The first layer 3(1) is then drawn down onto the second layer 3(2) and the coating 5 so that it is in contact with one or the other of them for a length L1.

EXAMPLES

Cables according to the present disclosure were compared with reference cables in the ability of their reinforcing layer in bearing the cable load.

Exemplary electrical cables according to the third embodiment described above and shown in FIG. 5 and FIGS. 6.1, 6.2 and 6.3 are described herein below.

All the cables had a length L of about 3.353 km (11,000 feet) and comprised:

three insulated electrical conductors, each conductor comprising a #4 AWG (21.2 mm$^2$) solid tinned copper with an outer diameter of 5.18 mm surrounded by an electrically insulating layer of EPR (ethylene propylene rubber) with an outer diameter of 9.4 mm;

a control cable including a twisted pair of #16 AWG (1.31 mm$^2$) solid bare copper wires, each one having an outer diameter of 1.29 mm and being surrounded by an electrically insulating layer of FEP (fluorinated ethylene propylene) having an outer diameter of 2.01 mm, a shield of aluminium/polyester tape surrounding the insulated twisted wires, and a sheath of ETFE (ethylene tetrafluoroethylene) surrounding the shield and having an outer diameter of 4.6 mm; and two pressure tubes of 316L stainless steel, having a wall thickness of 0.89 mm and an outer diameter of 3.18 mm.

The three insulated electrical conductors were stranded together and the control module and the two pressure tubes were arranged in the valleys between each pair of conductors.

The insulated electrical conductors, the control module and the pressure tubes were surrounded by a sheath made of EPR (ethylene propylene rubber) having a thickness of 2.00 mm and an outer diameter of 23.19 mm.

All the cables also comprised a reinforcing jacket. The reinforcing jacket had at least first layer (inner layer) of corrosion resistant metal alloy (Incoloy®825). Some cables had a second layer (intermediate layer) of stainless steel surrounding the first layer. Some cables had a third layer (outer layer) of stainless steel surrounding the first and the second layers. All of the layers were made in the form of circumferentially closed metallic tubes having a thickness of 1.18 mm.

The features of the reinforcing jacket layers for the considered cables are set forth in Table I.

TABLE I

|  | Inner diameter (mm) | Outer diameter (mm) | Cross section area (mm$^2$) | Weight (kg/km) | Load capacity (kg) |
|---|---|---|---|---|---|
| 1$^{st}$ layer | 23.19 | 25.56 | 90.66 | 1772 | 7734 |
| 2$^{nd}$ layer | 25.56 | 27.93 | 99.47 | 1964 | 9042 |
| 3$^{rd}$ layer | 27.93 | 30.30 | 108.27 | 2138 | 9843 |

The load capacity is the weight that the top end of a single layer in vertical position is able to bear with an elongation lower than 9%.

Comparative cables 1-3 had a reinforcing jacket made of from one to three layers as set forth in Table II. All of the layers of the reinforcing jacket of these cables had the same length, substantially equal to the sheathed core length. The total weight in Table II is that of the reinforcing jacket. Table II also shows the maximal cable length bearable without undue elongation of the layers and of the core accordingly (max length).

TABLE II

| Cable | Reinforcing jacket | Total weight (kg/km) | Max length (km) |
|---|---|---|---|
| 1 | 1$^{st}$ layer | 4235 | 1.83 |
| 2 | 1$^{st}$ layer + 2$^{nd}$ layer | 6198 | 2.71 |
| 3 | 1$^{st}$ layer + 2$^{nd}$ layer + 3$^{rd}$ layer | 8336 | 3.19 |

Cables 4 and 5 according to the present disclosure had a reinforcing jacket made, respectively, of two and three layers as set forth in Table III. While the first layer had a length substantially equal to the sheathed core length for both Cables 4 and 5, in Cable 4—having two layers—the second layer had a length, from the cable top end, substantially the half (50%) of the sheathed core length. In Cable 5—having three layers—the second layer had a length, from the cable top end, substantially two-third (66%) of the sheathed core length, and the third layer had a length, from the cable top end, substantially the one-third (33%) of the sheathed core length. The total weight in Table III is that of the reinforcing jacket. Table III also shows the maximal cable length bearable without undue elongation of the layers and of the core accordingly (max length).

TABLE III

| Cable | Reinforcing jacket | Total weight (kg/km) | Max length (km) |
|---|---|---|---|
| 4 | 1$^{st}$ layer + 2$^{nd}$ layer (50%) | 5216 | 3.22 |
| 5 | 1$^{st}$ layer + 2$^{nd}$ layer (66%) + 3$^{rd}$ layer (33%) | 6256 | 4.25 |

By comparing the max lengths of the cables in Table II and III, it is apparent that a reinforcing jacket comprising two layers configured according to the present disclosure (Cable 4) is suitable for bearing, with an elongation within safe limits, a cable length not only longer than that possible with a cable with a two-layered reinforcing jacket having the same length (Cable 2), but also just about 10% shorter than the max length safely bearable by a cable with a three-layered reinforcing jacket having the same length (Cable 3). In the case of Cable 5 according to the disclosure, the max length is about 75% longer than that of Cable 3.

The length of the layers of the reinforcing jacket of the cable of the disclosure can be easily calculated by a skilled person in order to maximize the advantage provided. For example, as the cable of the example is long about 3.353 km, and the configuration of Cable 5 allows a safe elongation up to 4.25 km, the skilled person can consider of reducing the length of the second and/or of the third layer for providing a reinforcing jacket capable of safely bearing just the cable length and saving material for the layers of the reinforcing jacket.

The length and the material (corrosion resistant metal or stainless steel) of each layer should also take into account the specific environment where the cable is deployed, for example the presence of corrosive fluids at a certain depth in a well.

The invention claimed is:

1. An electrical cable comprising:
    a core having a first length;
    a sheath surrounding the core and extending substantially through the first length; and
    a reinforcing jacket surrounding and in direct contact with the sheath, the reinforcing jacket being made of concentric layers comprising:
        a first layer longitudinally extending from a first end of the cable towards a second end of the cable and having a second length substantially equal to the first length; and
        a first further layer longitudinally extending from the first end of the cable towards the second end of the cable for a third length shorter than the first length,
    wherein each one of the first layer and the first further layer of the reinforcing jacket is a circumferentially closed metal tube.

2. The electrical cable according to claim 1, wherein the core comprises three electrical conductors each coated by an insulating system.

3. The electrical cable according to claim 1, wherein the reinforcing jacket is the outermost element of the electrical cable.

4. The electrical cable according to claim 1, wherein at least one among the first layer and the first further layer is made of a corrosion resistant metal alloy.

5. The electrical cable according to claim 1, wherein the first layer is made of a corrosion resistant metal alloy.

6. The electrical cable according to claim 1, wherein the first layer is the outermost element of the reinforcing jacket, and wherein the sheath is made of an expanded polymeric material and has a thickness increasing from the first end of the cable towards the second end of the cable.

7. The electrical cable according to claim 1, wherein the first layer is the outermost element of the reinforcing jacket, and the sheath is made of a non-expanded polymeric material and has a substantially constant thickness from the first end of the cable towards the second end of the cable.

8. The electrical cable according to claim 1, wherein the first layer is the outermost element of the reinforcing jacket, and a coating interposed between the sheath and the first layer along a cable portion from the end of the third length to the cable second end.

9. The electrical cable according to claim 8, wherein the coating is made of a non-expanded polymeric material.

10. The electrical cable according to claim 1, wherein the first layer is the innermost layer of the reinforcing jacket.

11. The electrical cable according to claim 1, wherein the reinforcing jacket comprises a second further layer disposed between the first further layer and the first layer, the third length of the first further layer being shorter than a fourth length of the second further layer.

12. The electrical cable according to claim 1, wherein the reinforcing jacket comprises a second further layer disposed between the first further layer and the first layer, the third length of the first further layer being longer than a fourth length of the second further layer.

13. A process for manufacturing an electric cable comprising a reinforcing jacket as outermost layer, the reinforcing jacket comprising concentric metal layers, wherein the process comprises forming at least one layer around a cable core starting from a continuous metallic tape with longitudinal edges, the tape being longitudinally folded and the edges welded to provide the at least one layer in form of a circumferentially closed tube.

14. The process according to claim 13, the process comprising forming the tube having an inner diameter on an underlying layer having an outer diameter, the inner diameter of the tube being greater than the outer diameter of the underlying layer, the process further comprising drawing the tube down on the underlying layer so that a direct contact is obtained.

15. The process according to claim 13, wherein the at least one layer comprises
    a first layer longitudinally extending from a first end of the cable towards a second end of the cable and having a second length substantially equal to a first length of the cable; and
    a first further layer longitudinally extending from the first end of the cable towards the second end of the cable for a third length shorter than the first length,
    wherein the first layer is a circumferentially closed metal tube.

16. The process according to claim 13, wherein at least one of the concentric metal layers is made of a corrosion resistant metal alloy.

17. The electrical cable according to claim 11, wherein the first further layer is the outermost layer of the electrical cable and the first layer is an inner layer of the electrical cable.

18. The electrical cable according to claim 11, wherein the first layer is the outermost layer of the electrical cable and the first further layer is an inner layer of the electrical cable.

19. The electrical cable according to claim 12, wherein the first layer is the outermost layer of the electrical cable and the first further layer is an inner layer of the electrical cable.

20. An electrical cable comprises:
    a core having a first length;
    a sheath surrounding the core and extending substantially through the first length; and
    a reinforcing jacket surrounding and in direct contact with the sheath, the reinforcing jacket being part of an outermost surface of the electrical cable, the reinforcing jacket being made of concentric layers comprising:
        a first layer longitudinally extending from a first end of the cable towards a second end of the cable and having a second length substantially equal to the first length, and
        a first further layer longitudinally extending from the first end of the cable towards the second end of the cable for a third length shorter than the first length,
    wherein each of the first layer and the first further layer comprise a continuous metallic tape that is longitudinally folded and welded to form a circumferentially closed metal tube, the closed metal tube being fluid-impervious.

* * * * *